(12) United States Patent
Kim et al.

(10) Patent No.: US 11,868,657 B2
(45) Date of Patent: Jan. 9, 2024

(54) MEMORY CONTROLLER, METHOD OF OPERATING THE MEMORY CONTROLLER, AND ELECTRONIC DEVICE INCLUDING THE MEMORY CONTROLLER

(71) Applicant: SAMSUNG ELECTRONICS CO., LTD., Suwon-si (KR)

(72) Inventors: Hyunsoo Kim, Bucheon-si (KR); Seungwon Lee, Hwaseong-si (KR); Seungwoo Seo, Incheon (KR); Hosang Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 17/472,990

(22) Filed: Sep. 13, 2021

(65) Prior Publication Data
US 2022/0253247 A1    Aug. 11, 2022

(30) Foreign Application Priority Data

Feb. 8, 2021  (KR) .................. 10-2021-0017675
May 12, 2021 (KR) .................. 10-2021-0061304

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 6,402,795 B1 | 6/2002 | Chu et al. | |
| 6,485,622 B1 | 11/2002 | Fu | |
| 7,901,658 B2 | 3/2011 | Weppner et al. | |
| 8,828,580 B2 | 9/2014 | Visco et al. | |
| 10,346,092 B2 | 7/2019 | Lea et al. | |
| 10,416,927 B2 | 9/2019 | Lea et al. | |
| 10,613,871 B2 | 4/2020 | Choi | |
| 10,902,906 B2 | 1/2021 | Murphy | |
| 2015/0012687 A1* | 1/2015 | Huang | G06F 3/0679 711/156 |
| 2017/0060588 A1 | 3/2017 | Choi | |
| 2017/0300239 A1* | 10/2017 | Choi | G06F 3/0611 |

(Continued)

FOREIGN PATENT DOCUMENTS

| | | |
|---|---|---|
| KR | 10-1858597 B1 | 5/2018 |
| KR | 10-2020-0129843 A | 11/2020 |
| WO | WO 2019/135319 A1 | 7/2019 |

*Primary Examiner* — Tracy A Warren
(74) *Attorney, Agent, or Firm* — NSIP Law

(57) ABSTRACT

A memory controller, a method of operating the memory controller, and an electronic device including the memory controller are disclosed. The method of operating a memory controller, comprising receiving, from a host core, a plurality of commands for a memory, identifying, from among the plurality of commands, processing in memory (PIM) commands to execute one or more operations in the memory, verifying ordering information from a data field in each of the PIM commands, and reordering the PIM commands based on the ordering information and transmitting the reordered PIM commands to the memory.

19 Claims, 5 Drawing Sheets

(56) References Cited

U.S. PATENT DOCUMENTS

| | | | |
|---|---|---|---|
| 2017/0344301 A1* | 11/2017 | Ryu | G06F 15/785 |
| 2018/0006326 A1 | 1/2018 | O'Neill et al. | |
| 2020/0035291 A1 | 1/2020 | Kasibhatla et al. | |
| 2020/0241803 A1 | 7/2020 | Lea et al. | |
| 2020/0293452 A1 | 9/2020 | Lee et al. | |
| 2020/0356305 A1* | 11/2020 | Kim | G06F 3/0659 |
| 2021/0224185 A1* | 7/2021 | Zhou | G06F 12/0246 |
| 2021/0349826 A1* | 11/2021 | Roy | G06F 13/1668 |

\* cited by examiner

MEMORY CONTROLLER, METHOD OF OPERATING THE MEMORY CONTROLLER, AND ELECTRONIC DEVICE INCLUDING THE MEMORY CONTROLLER

CROSS-REFERENCE TO RELATED APPLICATIONS

This application claims the benefit under 35 USC § 119(a) of Korean Patent Application No. 10-2021-0017675 filed on Feb. 8, 2021, and Korean Patent Application No. 10-2021-0061304 filed on May 12, 2021, in the Korean Intellectual Property Office, the entire disclosures of which are incorporated herein by reference for all purposes.

BACKGROUND

Field

The following description relates to a memory controller, a method of operating the memory controller, and an electronic device including the memory controller.

Description of Related Art

A semiconductor memory device may be functionally separated from a processor configured to perform an operation. In a system that implements applications such as neural networks, big data, and Internet of Things (IoT) that require an operation on a large amount of data, a large amount of data may be received and transmitted between a semiconductor device and a processor, and a bottleneck may frequently occur. To solve this issue, research on processing in memory (PIM) is being conducted for a semiconductor memory device that combines, with a memory function, a function of a processor configured to perform an operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of operating a memory controller, comprising receiving, from a host core, a plurality of commands for a memory, identifying, from among the plurality of commands, processing in memory (PIM) commands to execute one or more operations in the memory, verifying ordering information from a data field in each of the PIM commands, and reordering the PIM commands based on the ordering information and transmitting the reordered PIM commands to the memory.

The PIM commands may be based on a write command for the memory.

The identifying may include identifying, from among the plurality of commands, a PIM command based on whether identification (ID) information corresponding to the PIM command may be comprised in a data field of a write command.

The ID information may include a unique ID preset between the host core and the memory controller.

The receiving may include receiving the plurality of commands generated out of order in the host core.

The memory may be configured to perform the one or more operations based on PIM commands transmitted in order from the memory controller, and to return a result of performing the one or more operations to the memory controller.

The reordering of the PIM commands may include reordering PIM commands that are received from the host core prior to receiving a PIM command comprising an end index in ordering information.

The reordering of the PIM commands may include reordering PIM commands that are received from the host core prior to a barrier command being received from the host core.

The transmitting of the PIM commands to the memory may include converting the PIM commands from a digital signal to an analog signal and transmitting the analog signal to the memory.

In another general aspect, there is provided a memory controller, comprising a processing in memory (PIM) request detector configured to identify, from among a plurality of commands for a memory received from a host core, PIM commands to execute one or more operations in the memory, and a PIM request reorderer configured to reorder the PIM commands based on ordering information from a data field in each of the PIM commands, wherein the reordered PIM commands are transmitted to the memory.

The PIM commands may be based on a write command for the memory.

The PIM request detector may be configured to identify, from among the plurality of commands, a PIM command based on whether identification (ID) information corresponding to the PIM command may be comprised in a data field of a write command.

The ID information may include a unique ID preset between the host core and the memory controller.

The plurality of commands may be generated out of order in the host core.

The memory may be configured to perform the one or more operations based on PIM commands transmitted in order from the memory controller, and to return a result of performing the one or more operations to the memory controller.

The PIM request reorderer may be configured to reorder PIM commands that are received from the host core prior to receiving a PIM command comprising an end index in ordering information.

The PIM request reorderer may be configured to reorder PIM commands that are received from the host core prior to a barrier command being received from the host core.

In another general aspect, there is provided an electronic device, comprising a host core configured to generate a plurality of commands out of order for a memory, a memory controller configured to identify, from among the plurality of commands received from the host core, processing in memory (PIM) commands to execute one or more operations in the memory, and to reorder the PIM commands based on ordering information from a data field in each of the PIM commands, and the memory configured to perform the one or more operations based on the reordered PIM commands received in order from the memory controller.

Other features and aspects will be apparent from the following detailed description, the drawings, and the claims.

Figure 1:
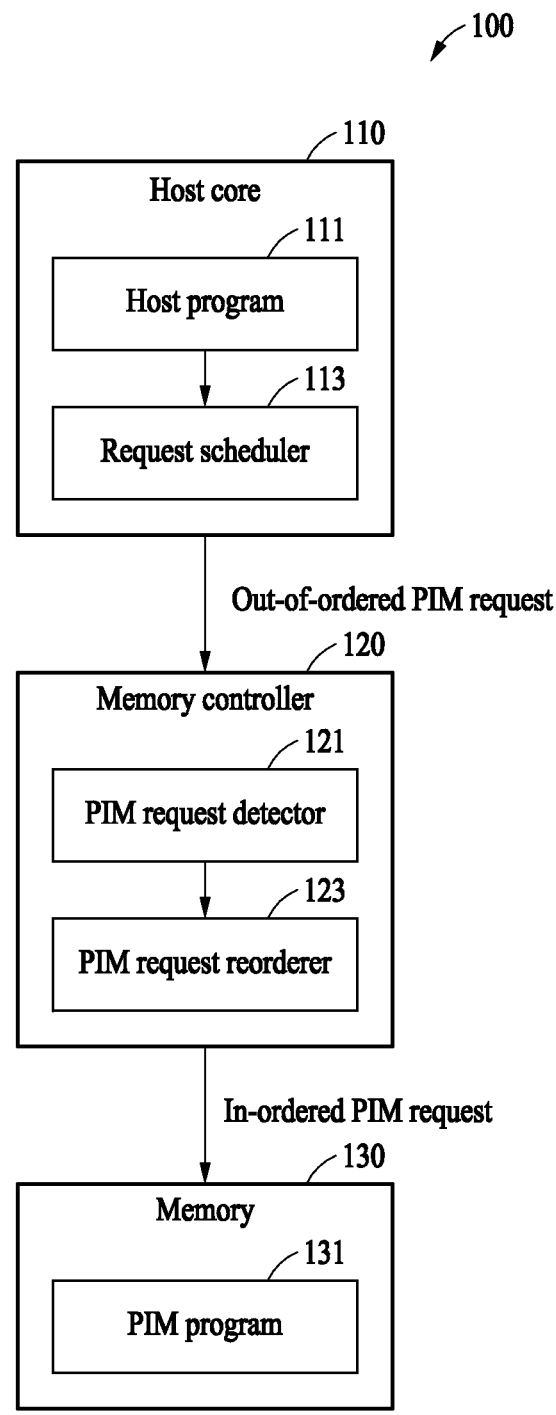
FIGS. 1 through 3 illustrate examples of operations of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

As used herein, the singular forms are intended to include the plural forms as well, unless the context clearly indicates otherwise. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

Figure 2:
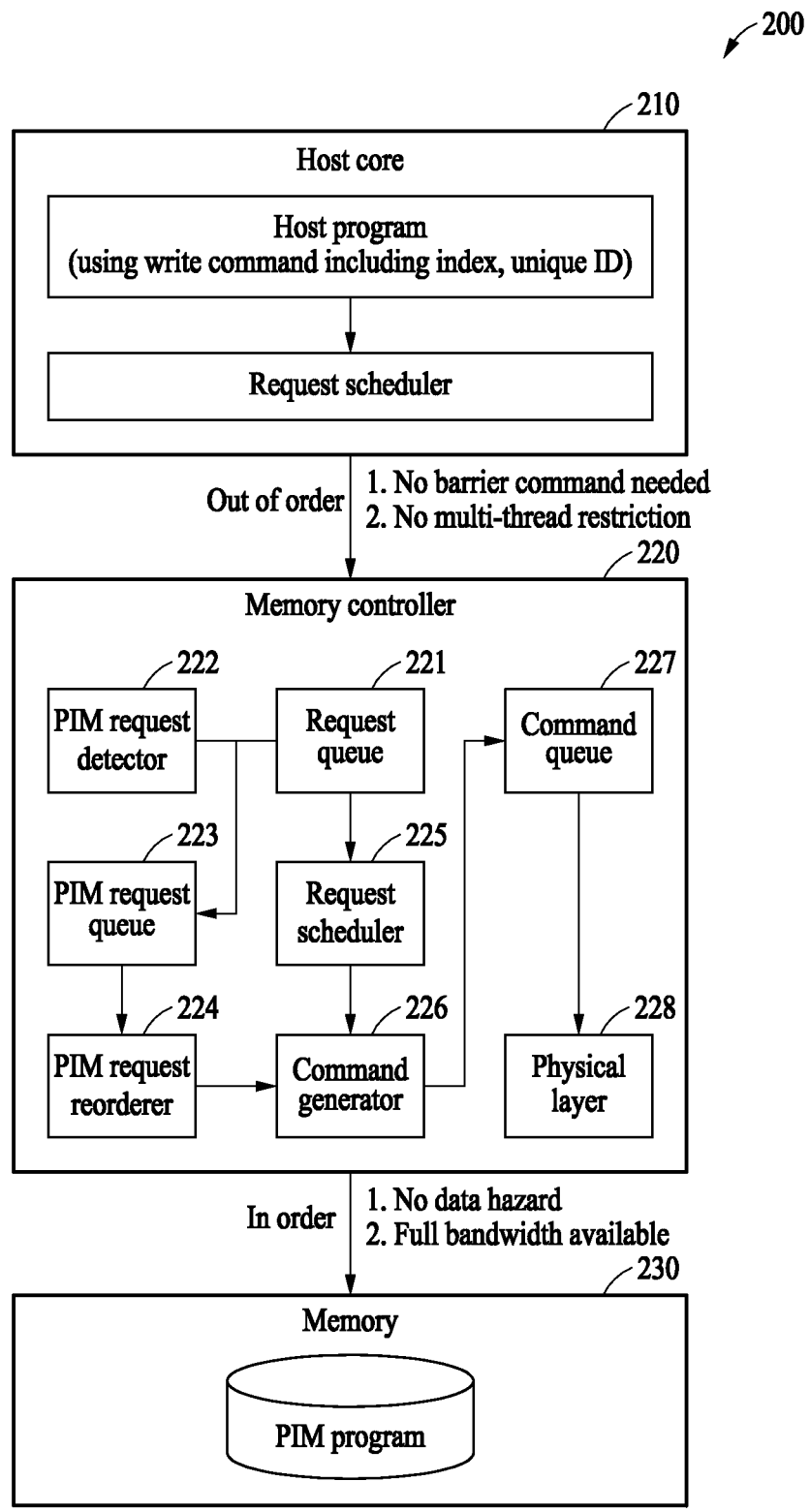
Figure 3:
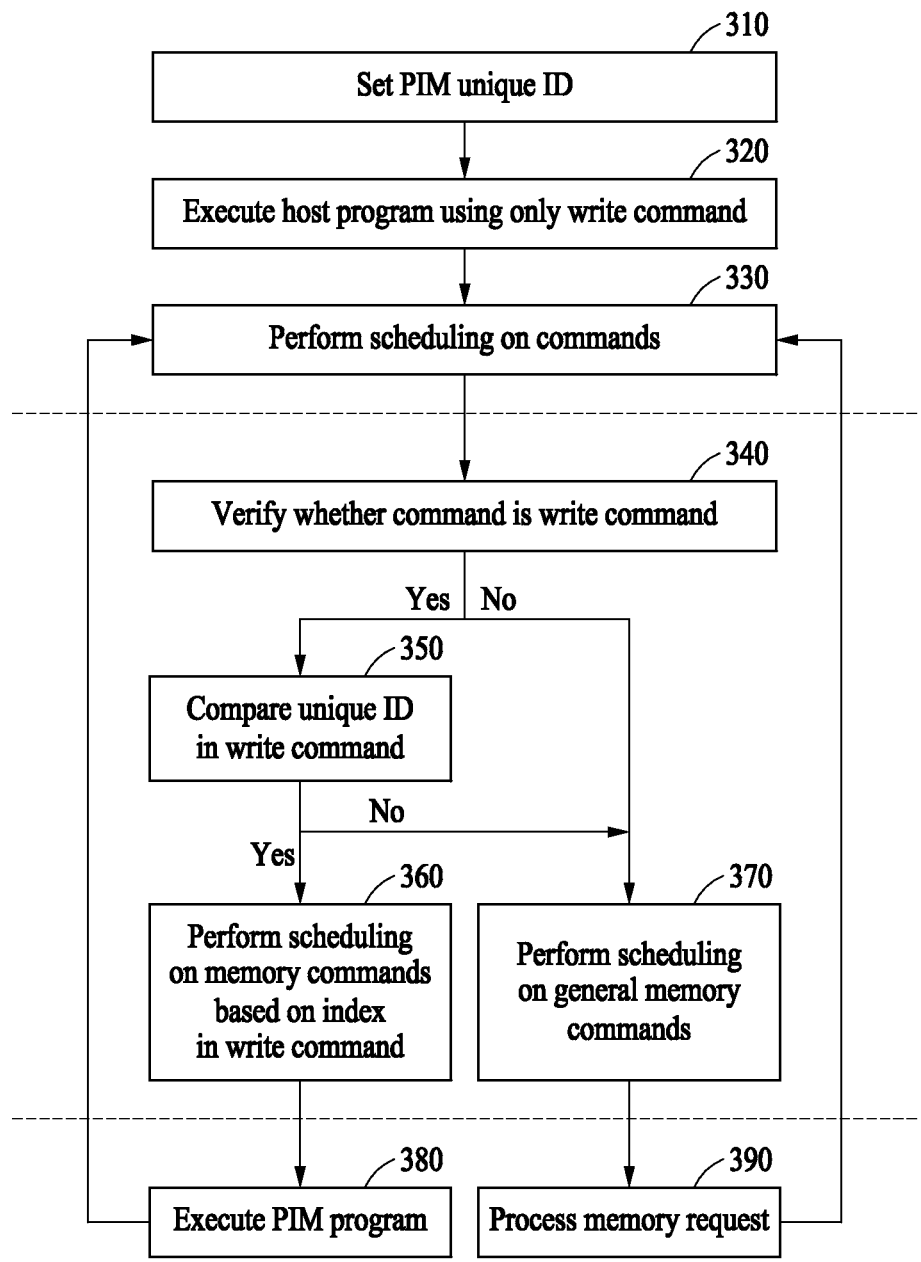

FIGS. 1 through 3 illustrate examples of operations of an electronic device.

Referring to FIG. 1, an electronic device 100 may include a host core 110, a memory controller 120, and a memory 130. The memory 130 may receive in order processing in memory (PIM) commands and perform one or more operations corresponding to the received PIM command, even when the host core 110 generates commands out of order. The terms "in order" used herein may be construed as being in sequential order, and "out of order" used herein as being in nonsequential order. Hereinafter, operations of the electronic device 100 will be described in greater detail.

The host core 110 may control an overall operation of the electronic device 100 and may be a data processing device implemented by hardware including a circuit having a physical structure to perform desired operations. For example, the desired operations may include code or instructions included in a program.

For example, the hardware-implemented data processing device may include a microprocessor, a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a microcomputer, a processor core, a multi-core processor, a multiprocessor, a central processing unit (CPU), an application-specific integrated circuit (ASIC), a field-programmable gate array (FPGA), a graphics processing unit (GPU), a neural processing unit (NPU), a tensor processing unit (TPU), a digital signal processor (DSP), a controller and an arithmetic logic unit (ALU), an application processor (AP), a neural processing unit (NPU), or a programmable logic unit (PLU). In an example, the host core 110 may generate a command for components (e.g., the memory 130, etc.) in the electronic device 100 through a host program 111.

A command generated by the host core 110 for the memory 130 may include a general command for the memory 130 and a PIM command for a PIM operation to be performed in the memory 130. The general command may include a command for a general operation of the memory 130, for example, read, write, copy, erase, and the like. The PIM command may include a command for performing an operation including at least one of an arithmetic operation (e.g., addition, multiplication, accumulation, etc.) and a logical operation (e.g., AND, OR, XOR, etc.) in the memory

130. Through the PIM command, an operation may be directly performed in the memory 130 without bringing a large amount of operand data from the memory 130, and then only fetching a result of the operation may need to be performed. Thus, it is possible to minimize an unnecessary loss of a memory bandwidth.

The host core 110 may generate a plurality of commands in nonsequential order, or out of order as used herein. In contrast, the memory 130 may perform in order PIM command-based operations. To maintain such optimal characteristics, the host core 110 may generate a PIM command based on a write command. Since data needed for an operation based on the PIM command may be already present in the memory 130, a data field of the write command may be used for information storage to transmit in order PIM commands to the memory 130.

The host core 110 may generate a PIM command by including, in the data field of the write command, identification (ID) information that indicates a PIM command and ordering information of the PIM command. The ID information may include a unique ID preset between the host core 110 and the memory controller 120. The unique ID may be determined as a combination of 0 and 1 of a preset bit size but may not be limited thereto. The ordering information may include an index that increases sequentially from 0 or 1 but may not be limited thereto.

A request scheduler 113 may perform scheduling on a plurality of commands generated through the host program 111. The host core 110 may transmit out of order the commands for the memory 130 to the memory controller 120.

The memory controller 120 may control a flow of data that is input to or output from the memory 130. The memory controller 120 may process the commands for the memory 130 received from the host core 110 and transmit the processed commands to the memory 130. The memory controller 120 may reorder the commands to provide an optimal performance for a memory transaction that generally occurs in the electronic device 100.

The memory controller 120 may include a PIM request detector 121 and a PIM request reorderer 123.

The PIM request detector 121 may identify, from among a plurality of commands received from the host core 110, PIM commands for executing one or more operations in the memory 130. The PIM request detector 121 may determine whether ID information stored in a data field of a write command matches ID information corresponding to a PIM command previously stored in the memory controller 120. For example, when a value stored in a data field of a write command received from the host core 110 matches the ID information corresponding to the PIM command previously stored in the memory controller 120, the PIM request detector 121 may identify corresponding write information as the PIM command. In another example, when the value stored in the data field of the write command received from the host core 110 does not match the ID information corresponding to the PIM command previously stored in the memory controller 120, the PIM request detector 121 may identify the write information as the general command, not as the PM command. Commands identified as the general command may be processed by an operation of the memory controller 120 and transmitted to the memory 130.

The PIM request reorderer 123 may reorder the PIM commands based on ordering information verified from a data field included in each of the PIM commands. The PIM request reorderer 123 may reorder the PIM commands in order based on an index included in the ordering information. Thus, even when the host core 110 generates out of order commands and transmits them to the memory controller 120, the memory controller 120 may reorder the PIM commands based on the ordering information and transmit in order the PIM commands to the memory 130.

In addition to storing data, the memory 130 may perform a PIM operation through an internal processor. For example, the memory 130 may be a dynamic random-access memory (DRAM), a static random access memory (SRAM), a thyristor RAM (T-RAM), a zero capacitor RAM (Z-RAM), or a twin transistor RAM (TTRAM), but may not be limited thereto. The memory 130 may perform one or more operations based on PIM commands received in order from the memory controller 120. Here, a PIM program 131 may be used, and the memory 130 may return a result of the operation to the memory controller 120.

As described above, a write command-based PIM command may enable the host core 110 to maintain a characteristic of generating out-of-order commands and enable PIM operations to be controlled to be in order in the memory 130, without memory command ordering control that uses a host intrinsic such as a memory barrier or a memory fence. In addition, when using a multi-thread to effectively generate a memory command in the host core 110, the memory 130 may perform in order operations that are based on PIM commands, even though orders of simultaneously generated memory commands are not defined.

Referring to FIG. 2, a memory controller 220 may include a request queue 221, a PIM request detector 222, a PIM request queue 223, a PIM request reorderer 224, a request scheduler 225, a command generator 226, a command queue 227, and a physical layer 228.

The request queue 221 may store a plurality of commands received from a host core 210.

In an example, the PIM request detector 222 may identify, from among a plurality of commands stored in the request queue 221, PIM commands for executing one or more operations in a memory 230. The PIM request detector 222 may select only write commands from among the commands, and identify a command including ID information in a data field as a PIM command from among the selected write commands. The ID information may include a unique ID that is preset between the host core 210 and the memory controller 220.

The PIM request queue 223 may store identified PIM commands. The PIM commands stored in the PIM request queue 223 may be reordered by the PIM request reorderer 224.

In an example, the PIM request reorderer 224 may reorder the PIM commands based on ordering information stored in a data field of the PIM commands stored in the PIM request queue 223. For example, the PIM request reorderer 224 may reorder the PIM commands in an ascending order of the ordering information. The ordering information may include an index that increases sequentially from 0 or 1.

In an example, the PIM request reorderer 224 may reorder PIM commands that are stored for a period of time in the PIM request queue 223. The PIM request reorderer 224 may reorder PIM commands that are received from the host core 210 and stored in the PIM request queue 223 until a PIM command is received from the host core 210, which indicates an end in the ordering information in a data field. In this example, when the host core 210 completes generating PIM commands for a PIM operation, the host core 210 may generate a PIM command including an end index in ordering information and transmit the generated PIM command to the memory controller 220. When the PIM command including the end index is received while the PIM request queue 223 is storing the PIM commands received from the host core 210, the PIM request reorderer 224 may reorder the PIM commands stored in the PIM request queue 223.

In another example, the PIM request reorderer 224 may reorder PIM commands that are received from the host core 210 and stored in the PIM request queue 223 until a barrier command is received from the host core 210. In this example, when the host core 210 completes generating PIM commands for a PIM operation, the host core 210 may generate a barrier command and transmit the barrier command to the memory controller 220. When a PIM command including an end index is received while the PIM request queue 223 is storing the PIM commands received from the host core 210 until the barrier command is received, the PIM request reorderer 224 may reorder the PIM commands that are stored in the PIM request queue 223. In an example, a barrier command described herein may be used to prevent an order of a memory command generated before and after the barrier command from changing, and may also be referred to as a memory barrier or a memory fence. In an example, the barrier command may be a synchronization command for controlling an ordering of memory commands in the host core 210. In an example, the barrier command may be used to fix an ordering of some of the commands generated out of order in the host core 210.

The request scheduler 225 may perform scheduling on a plurality of commands stored in the request queue 221. Unlike a request scheduler included in the host core 210 that performs scheduling on commands for various components included in an electronic device 200, the request scheduler 225 may perform scheduling on memory-related commands. For example, the request scheduler 225 may change an ordering of the commands stored in the request queue 221 to make the memory 230 more accessible and transmit the commands to the command generator 226 in the changed order. During this process, the ordering of the commands stored in the request queue 221 may be changed. For example, the request scheduler 225 may change an ordering of a read command, a read command, and a write command stored in the request queue 221 to an ordering of the write command, the read command, and the read command to increase memory access, and transmit the commands to the command generator 226 in the changed order.

The command generator 226 may generate detailed commands of commands scheduled in the request scheduler 225 and/or PIM commands reordered in the PIM request reorderer 224. For example, the command generator 226 may generate auxiliary commands (e.g., activate, precharge, refresh, etc.) that are needed for the memory 230 to perform at least one operation among read, write, copy, and erase based on a command generated by the host core 210.

The command queue 227 may store commands generated by or transmitted from the command generator 226.

The physical layer 228 may convert commands stored in the command queue 227 from a digital signal to an analog signal and transmit the commands as the analog signal to the memory 230.

In an example, by storing ordering information in a data field instead of a barrier command that is needed because the host core 210 generates PIM commands out of order, it is possible to effectively utilize a memory bandwidth that may be restricted due to a barrier overhead and a sequential transaction and improve PIM operation performance in the memory 230. In addition, by storing ID information and ordering information in a data field, and by reordering PIM commands and transmitting the reordered PIM commands in order to the memory 230, it is possible to ensure sequential operations of the memory 230 while allowing the host core 210 to efficiently generate memory commands without being restricted by a multi-thread that does not ensure an ordering of simultaneously generated commands.

In an example, the memory controller 220 may reorder PIM commands based on ID information and ordering information stored in a data field and transmit in order the PIM commands to the memory 230, and it is thus possible to effectively prevent a data hazard that may occur when the PIM commands are received out of order beyond an acceptable range of a register. In addition, one or more operations based on a PIM command may be effectively performed in the memory 230 and only a result of the operation may be returned to the memory controller 220, and it is thus possible to more effectively utilize a bandwidth of the memory 230.

FIG. 3 is a diagram illustrating an example of a flow of operations of a host core, a memory controller, and a memory. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. Operations 310 to 390 may be performed by any one or any combination of the electronic device 100, the electronic device 200, and the memory controller 220. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In operation 310, a unique ID for a PIM command may be set, and the unique ID may be shared between the host core and the memory controller. The unique ID may be used to identify a write command-based PIM command associated with a PIM operation in the memory controller. The memory controller may identify a PIM command based on whether a value stored in a data field of a received write command matches the preset unique ID.

In operation 320, the host core may generate a PIM command by executing a host program using only a write command. The host core may generate, as a PIM command, a write command in which a unique ID indicating a PIM command and information associated with an order of the PIM command are input to a data field. When the host core executes the host program using both a read command and a write command and generates a PIM command, a PIM memory area may need to be managed by an uncacheable policy. On the other hand, when the host core uses only the write command, a read operation may be managed by a cacheable policy and a write operation may be managed by a write-through mode for the PIM memory area. Thus, a cache policy effective for each of the read operation and the write operation of the memory may be applied as described in the foregoing, and thus the performance of an electronic device including the host core and the PIM memory may be effectively improved.

In an example, ordering information may be added to a data field when the host core generates a PIM command, and thus an ordering of PIM commands to be transmitted from the memory controller to the memory may be ensured.

In operation 330, a request scheduler of the host core may perform scheduling on commands generated by the host core and transmit the scheduled commands to the memory controller.

In operation 340, the memory controller may verify whether a command received from the host core is a write command. When the write command is received from the host core, operation 350 may be performed. When a command that is not the write command is received from the host core, such as, for example, a read command, operation 370 may be performed.

In operation 350, the memory controller may determine whether a unique ID stored in a data field of the write command matches the unique ID set in operation 310. When the unique ID in the data field of the write command matches the unique ID set in operation 310, operation 360 may be performed. When the unique ID in the data field of the write command does not match the unique ID set in operation 310, operation 370 may be performed.

In operation 360, the memory controller may perform scheduling on PIM commands corresponding to a memory command based on an index stored in the data field of the write command. In operation 380, the memory may execute a PIM program based on PIM commands received in order and perform one or more operations based on the PIM commands. The one or more operations may include at least one of an arithmetic operation (e.g., addition, multiplication, accumulation, etc.) and a logical operation (e.g., AND, OR, XOR, etc.), but examples of which may not be limited thereto.

In operation 370, the memory controller may perform scheduling on general commands which are not the PIM commands. In operation 390, the memory may perform an operation based on a general command transmitted from the memory controller.

PIM commands may be transmitted to and processed in the memory in order, while the general commands may be transmitted to and processed in the memory out of order. Thus, an operation of the memory may be controlled according to a characteristic of each command. In an example, since a PIM command is based on a write command, an ordering policy for a read command may not be changed.

Figure 4:
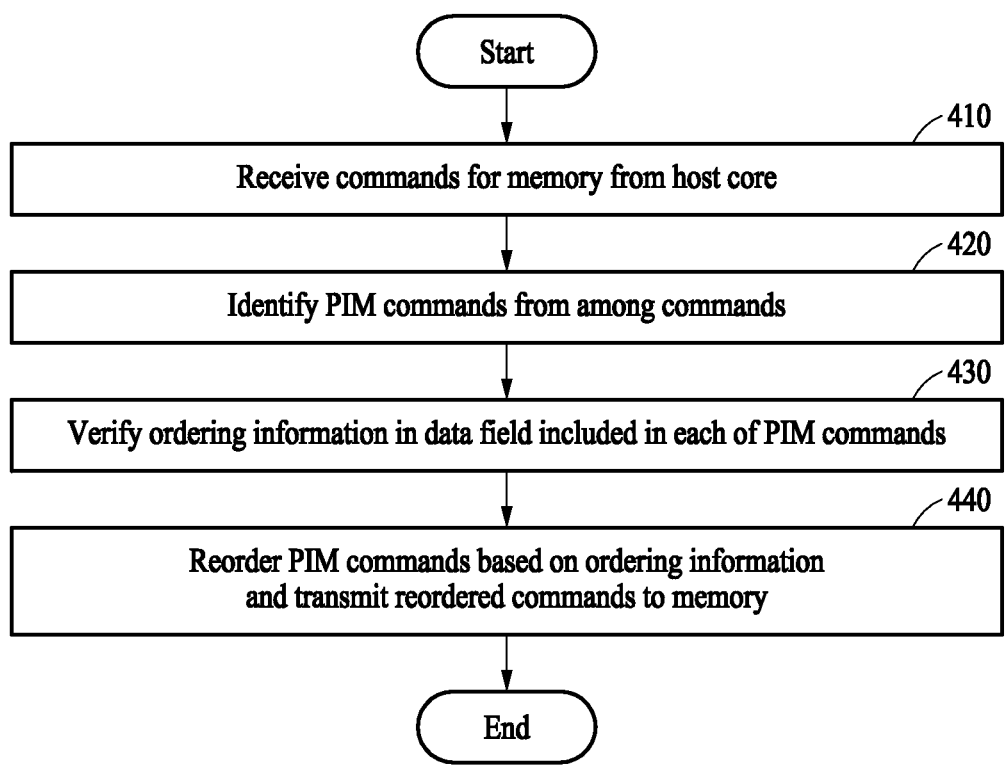
FIG. 4 illustrates an example of an operating method of a memory controller.

FIG. 4 illustrates an example of an operating method of a memory controller. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. Operations 410 to 440 may be performed by any one or any combination of the electronic device 100, the electronic device 200, and the memory controller 220. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 410, the memory controller may receive, from a host core, a plurality of commands for a memory. In an example, the memory controller may receive a plurality of commands generated out of order in the host core.

In operation 420, the memory controller may identify, from among the commands, PIM commands for executing one or more operations in the memory. In an example, the PIM commands may be based on a write command for the memory. In an example, the memory controller may identify, from among the commands, a PIM command by verifying whether ID information corresponding to the PIM command is included in a data field of the write command. The ID information may include a unique ID preset between the host core and the memory controller.

In operation 430, the memory controller may verify ordering information in the data field included in each of the PIM commands.

In operation 440, the memory controller may reorder the PIM commands based on the ordering information and transmit them to the memory. in an example, the memory controller may reorder the PIM commands that are received from the host core until a PIM command of which ordering information in the data field indicates an end is received from the host core. in an example, the memory controller may reorder the PIM commands that are received from the host core until a barrier command is received from the host core.

The memory may perform the one or more operations based on the PIM commands transmitted in order from the memory controller and return a result of the one or more operations to the memory controller.

Figure 5:
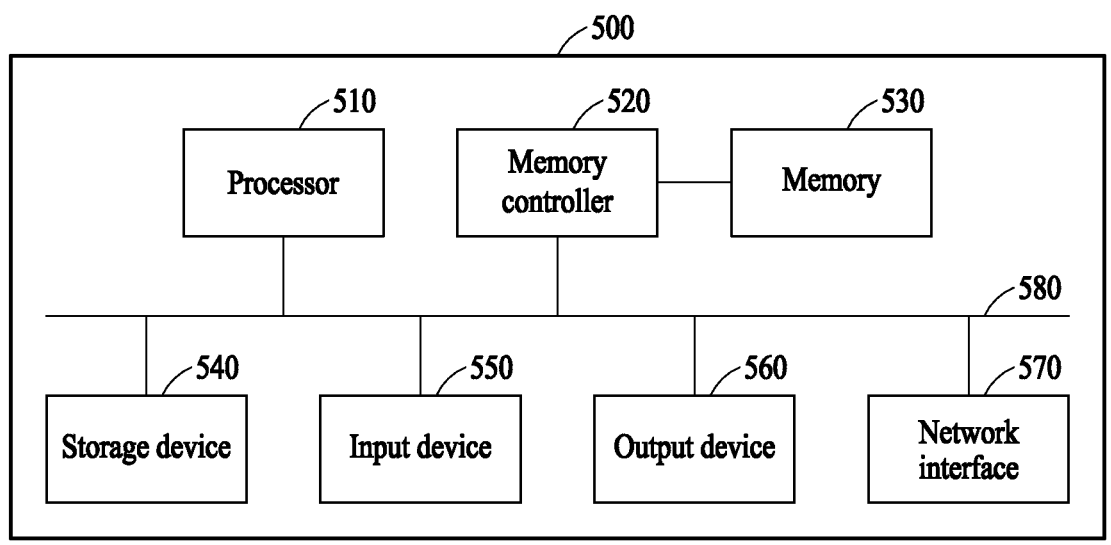
FIG. 5 illustrates an example of an electronic device.

FIG. 5 illustrates an example of an electronic device.

Referring to FIG. 5, an electronic device 500 may include a processor 510, a memory controller 520, a memory 530, a storage device 540, an input device 550, an output device 560, and a network interface 570. The processor 510, the memory controller 520, the memory 530, the storage device 540, the input device 550, the output device 560, and the network interface 570 may communicate with one another through a bus 580. For example, the electronic device 500 may be implemented as a part of various mobile devices including, for example, a mobile phone, a smartphone, a personal digital assistant (PDA), a netbook, a tablet personal computer (PC), a laptop computer, and the like, wearable devices including, for example, a smartwatch, a smart band, smart glasses, and the like, computing devices including, for example, a desktop, a server, and the like, home appliances including, for example, a television (TV), a smart TV, a refrigerator, and the like, security devices including, for example, a door lock, and the like, and vehicles including, for example, an autonomous vehicle, a smart vehicle, and the like.

The processor 510 may include a host core configured to perform functions and commands to be performed in the electronic device 500. An example of the processor is described above with reference to FIG. 1. For example, the processor 510 may process commands stored in the memory 530 or the storage device 540. Further details regarding the processor 510, memory 530, and the storage device 540 is provided below.

The memory controller 520 may be a device for controlling a flow of data input to or output from the memory 530. The memory controller 520 may identify, from among a plurality of commands for the memory 530 received from the processor 510, PIM commands for executing one or more operations in the memory 530, reorder the PIM commands based on ordering information verified from a data field included in each of the PIM commands, and transmit the reordered PIM commands to the memory 530.

The memory 530 may include a computer-readable storage medium or a computer-readable storage device. The memory 530 may store commands to be executed by the processor 510, store related information while software and/or applications are executed by the electronic device 500, and perform one or more operations based on a PIM command.

The processor 510, the memory controller 520, and the memory 530 may perform one or more, or all, of the operations described above with reference to FIGS. 1 through 4.

The input device 550 may receive an input from a user by a traditional input method through a keyboard and a mouse, and by a new input method through a touch input, a voice input, a gesture input, a neural input, and an image input. The input device 550 may include, for example, a keyboard, a mouse, a touch screen, a microphone, or any other device that detects an input from a user and transmits the detected input to the electronic device 500. The output device 560 may provide an output of the electronic device 500 to a user through a visual, auditory, or tactile channel. The output device 560 may include, for example, a display, a touch screen, a speaker, a vibration generation device, or any other device that provides an output to a user. The network interface 570 may communicate with an external device through a wired or wireless network.

The electronic device 500 may also process the operations described above.

According to example embodiments, the electronic device 500 may be provided in a data center-oriented server system to be used for a memory-intensive operation, or provided in an image sensor, a mobile device, and Internet of things (IoT) device to be used for a memory-intensive operation. However, examples of which are not limited to the foregoing examples, and various applications may be used without limitation.

According to example embodiments, by controlling a PIM device that operates in order in a host core that operates out of order, it is possible to efficiently perform a PIM operation in a memory while utilizing maximum parallelism in the host core, without a need for a synchronization operation for matching an ordering of commands for a PIM operation in the host core.

The electronic device 100, the electronic device 200, host core 110, the memory controller 120, the request scheduler 113, the PIM request detector 121, the PIM request reorderer 123, the memory controller 220, the request queue 221, the PIM request detector 222, the PIM request queue 223, the PIM request reorderer 224, the request scheduler 225, the command generator 226, the command queue 227, the physical layer 228, the memory controller 520, the input device 550, the output device 560, the network interface 570, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of operating a memory controller. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating a memory controller, comprising:
   receiving, from a host core, a plurality of commands for a memory;
   depending on a result of verification that a command, from among the plurality of commands, being verified as a write command, based on determining if a portion of data stored in a data field of the write command matches a preset identification previously stored in the memory controller, identifying, from among the plurality of commands, processing in memory (PIM) commands to execute one or more operations in the memory;
   verifying ordering information from a data field in each of the PIM commands; and
   reordering the PIM commands based on the ordering information and transmitting the reordered PIM commands to the memory.

2. The method of claim 1, wherein the PIM commands are based on the write command for the memory.

3. The method of claim 1, wherein the identifying comprises:
   in response to the command, from among the plurality of commands, being verified as the write command, identifying the command as a PIM command, based on the portion of data stored in the data field of the write command, and
   in response to the command being verified as a read command, identifying the command as a general memory command.

4. The method of claim 3, wherein the portion of data stored in the data field of the write command comprises:
   a unique ID preset between the host core and the memory controller.

5. The method of claim 1, wherein the receiving comprises:
   receiving the plurality of commands generated out of order in the host core.

6. The method of claim 1, wherein the memory is configured to:
   perform the one or more operations based on PIM commands transmitted in order from the memory controller, and to return a result of performing the one or more operations to the memory controller.

7. The method of claim 1, wherein the reordering of the PIM commands comprises:
   reordering PIM commands that are received from the host core prior to receiving a PIM command comprising an end index in ordering information.

8. The method of claim 1, wherein the reordering of the PIM commands comprises:
   reordering PIM commands that are received from the host core prior to a barrier command being received from the host core.

9. The operating method of claim 1, wherein the transmitting of the PIM commands to the memory comprises converting the PIM commands from a digital signal to an analog signal and transmitting the analog signal to the memory.

10. A non-transitory computer-readable storage medium storing instructions that, when executed by a processor, cause the processor to perform the operating method of claim 1.

11. A memory controller, comprising:
a processing in memory (PIM) request detector configured to, depending on a result of verification that a command, from among a plurality of commands for a memory received from a host core, being verified as a write command, based on determining if a portion of data stored in a data field of the write command matches a preset identification previously stored in the memory controller, identify, from among the plurality of commands, PIM commands to execute one or more operations in the memory; and
a PIM request reorderer configured to reorder the PIM commands based on ordering information from a data field in each of the PIM commands,
wherein the reordered PIM commands are transmitted to the memory.

12. The memory controller of claim 11, wherein the PIM commands are based on the write command for the memory.

13. The memory controller of claim 11, wherein the PIM request detector is further configured to:
in response to the command, from among the plurality of commands, being verified as the write command, identify the command as a PIM command based on the portion of data stored in the data field of the write command, and
in response to the command being verified as a read command, identifying the command as a general memory command.

14. The memory controller of claim 13, wherein the portion of data stored in the data field of the write command comprises:
a unique ID preset between the host core and the memory controller.

15. The memory controller of claim 11, wherein the plurality of commands is generated out of order in the host core.

16. The memory controller of claim 11, wherein the memory is configured to:
perform the one or more operations based on PIM commands transmitted in order from the memory controller, and to return a result of performing the one or more operations to the memory controller.

17. The memory controller of claim 11, wherein the PIM request reorderer is further configured to:
reorder PIM commands that are received from the host core prior to receiving a PIM command comprising an end index in ordering information.

18. The memory controller of claim 11, wherein the PIM request reorderer is further configured to:
reorder PIM commands that are received from the host core prior to a barrier command being received from the host core.

19. An electronic device, comprising:
a host core configured to generate a plurality of commands out of order for a memory;
a memory controller configured to, depending on a result of verification that each command, from among the plurality of commands received from the host core, being verified as a write command, based on determining if a portion of data stored in a data field of each command matches a preset identification previously stored in the memory controller, identify, from among the plurality of commands, processing in memory (PIM) commands to execute one or more operations in the memory, and to reorder the PIM commands based on ordering information from a data field in each of the PIM commands; and
the memory configured to perform the one or more operations based on the reordered PIM commands received in order from the memory controller.

\* \* \* \* \*